US005195167A

United States Patent [19]
Bahl et al.

[11] Patent Number: 5,195,167
[45] Date of Patent: Mar. 16, 1993

[54] APPARATUS AND METHOD OF GROUPING UTTERANCES OF A PHONEME INTO CONTEXT-DEPENDENT CATEGORIES BASED ON SOUND-SIMILARITY FOR AUTOMATIC SPEECH RECOGNITION

[75] Inventors: Lalit R. Bahl, Amawalk; Peter V. De Souza, Yorktown Heights; Ponani S. Gopalakrishnan, Croton-on-Hudson; David Nahamoo; Michael A. Picheny, both of White Plains, all of N.Y.

[73] Assignee: International Business Machines Corporation, Armonk, N.Y.

[21] Appl. No.: 871,600

[22] Filed: Apr. 17, 1992

Related U.S. Application Data

[63] Continuation of Ser. No. 468,546, Jan. 23, 1990, abandoned.

[51] Int. Cl.$^5$ ............................ G10L 9/00; G10L 9/06
[52] U.S. Cl. ........................................................ 395/2
[58] Field of Search ............................ 395/2; 381/41-43

[56] References Cited

U.S. PATENT DOCUMENTS

| | | | |
|---|---|---|---|
| 4,592,085 | 5/1986 | Watari et al. | 381/43 |
| 4,661,915 | 4/1987 | Ott | 364/513.5 |
| 4,716,593 | 12/1987 | Hirai et al. | 381/42 |
| 4,759,068 | 7/1988 | Bahl et al. | 381/43 |
| 4,799,261 | 1/1989 | Lin et al. | 381/36 |
| 4,829,572 | 5/1989 | Kong | 381/41 |
| 4,833,712 | 5/1989 | Bahl et al. | 381/43 |
| 4,975,959 | 12/1990 | Benbassat | 381/41 |

OTHER PUBLICATIONS

Wilpon, "A Modified K-Means Clustering Algorithm for Use in Isolated Word Recognition," IEEE Trans. on ASSP, vol. ASSP-33, No. 3, Jun. 1985, pp. 587-594.

Levinson et al, "Interactive Clustering Techniques for Selecting Speaker-Independent Reference Templates for Isolated Word Recognition", IEEE Trans. on ASSP, vol. ASSP-27, No. 2, Apr. 1979.

Rabiner et al., "Speaker-Independent Recognition of Isolated Words Using Clustering Techniques", IEEE Trans. on ASSP, vol. ASSP-27, No. 4, Aug. 1979, pp. 339-349.

Bahl, L. R. et al. "Acoustic Markov Models Used In The Tangora Speech Recognition System," *Proc. 1988 IEEE ICASSP*, pp. 497-500, 1988.

*Primary Examiner*—David D. Knepper
*Attorney, Agent, or Firm*—Marc D. Schechter

[57] ABSTRACT

Symbol feature values and contextual feature values of each event in a training set of events are measured. At least two pairs of complementary subsets of observed events are selected. In each pair of complementary subsets of observed events, one subset has contextual features with values in a set $C_n$, and the other set has contextual features with values in a set $\overline{C}_n$, were the sets in $C_n$ and $\overline{C}_n$ are complementary sets of contextual feature values. For each subset of observed events, the similarity values of the symbol features of the observed events in the subsets are calculated. For each pair of complementary sets of observed events, a "goodness of fit" is the sum of the symbol feature value similarity of the subsets. The sets of contextual feature values associated with the subsets of observed events having the best "goodness of fit" are identified and form context-dependent bases for grouping the observed events into two output sets.

10 Claims, 4 Drawing Sheets

APPARATUS AND METHOD OF GROUPING UTTERANCES OF A PHONEME INTO CONTEXT-DEPENDENT CATEGORIES BASED ON SOUND-SIMILARITY FOR AUTOMATIC SPEECH RECOGNITION

This is a continuation of application Ser. No. 07/468,546, filed Jan. 23, 1990, now abandoned.

BACKGROUND OF THE INVENTION

The invention relates to automatically grouping observed events into similar categories and correlating the groups of observed events with different contexts for use in automatic pattern recognition. More specifically, the invention relates to automatically grouping utterances of a speech unit (for example, utterances of a phoneme) into categories having similar sounds (that is, categories having similar acoustic features), and correlating the groups of utterances with different contexts, for use in automatic speech recognition.

In continuous speech, there is known to exist a co-articulation effect. Co-articulation is the utterance of two or more speech units (for example, two words or two phonemes) with little or no pause between the words or phones. The co-articulation effect is the variation in the pronunciation of a speech unit in dependence on the other speech units with which it is co-articulated. Prior attempts to manually enumerate a set of co-articulation rules have been prone to large errors.

In automatic speech recognition, the acoustic features of an utterance of an unknown sequence of one or more speech units are "fit" to a number of hypothesis models of hypothesis sequences of speech units. A sequence of speech units may be, for example, a string of one or more words. The hypothesis model of the sequence of speech units is constructed by concatenating the models of the words in the sequence.

While it would simplify the process of automatic speech recognition to provide only a single model for each word in the vocabulary, recognition accuracy can be improved by providing a different model of each word for each alternative pronunciation of the word.

An automatic method of generating co-articulation rules and generating word or phoneme models according to these rules is described in U.S. patent application Ser. No. 323,479, filed on Mar. 14, 1989, assigned to the assignee of the present application. In this method, multiple utterances of a phoneme in different contexts are processed to produce, for each utterance, (i) a string of labels representing the acoustic features of the uttered phoneme, and (ii) a representation of the context of the uttered phoneme (i.e. a representation of the context phonemes which precede and which follow the uttered phoneme). The label strings for the uttered phoneme are clustered into acoustically similar categories, so that each utterance of the phoneme is associated with a cluster number and a context.

From the multiple utterances, a number of candidate contexts are identified. For each candidate context and its complement, the conditional probabilities of each cluster are estimated. From the conditional probabilities, conditional entropies are calculated for each candidate context and its complement. The conditional entropies represent the average information obtained about the cluster number from the context of an uttered phoneme. The candidate context and its complement associated with the optimum entropies are selected as the basis for the best split of the multiple utterances. Each set of utterances resulting from this split is either further split in the manner described above, or is used as the basis of forming a context-dependent model of the phoneme.

The known method of enumerating co-articulation rules generates a number of different context-dependent models for each phoneme. The use of these context-dependent models according to the co-articulation rules increases recognition accuracy as compared to the use of a single model for each phoneme. However, the clustering step used in the known method requires a large amount of computation time. Moreover, by basing the entropy calculations (the splitting criteria) on the cluster numbers, information about how different two clusters are is lost. Two or more very dissimilar clusters may be combined into a single subset of the split so long as the total entropy of the split is reduced.

SUMMARY OF THE INVENTION

It is an object of the invention to automatically group observed events into similar categories and to correlate the groups of observed events with different contexts without the time-consuming pre-clustering of the observed events.

It is another object of the invention to provide a method of automatically grouping observed events into similar categories and correlating the groups with different contexts in such a way as to possibly obtain more accurate groupings.

According to the present invention, a method of automatically grouping observed events into similar categories and correlating the groups of observed events with different context starts by providing a training set U of a plurality of observed events $U_p$ representing the same information in different contexts. Each observed event has at least one symbol feature having a value, and at least one contextual feature having a value.

Next, the value of the symbol feature of each event is measured, and the value of the contextual feature of each event is measured.

From the set U of observed events, a first pair of subsets $U(C_1)$ and $\overline{U(C_1)}$ are selected. The subset $U(C_1)$ has contextual features with values in a set $C_1$. The subset $\overline{U(C_1)}$ has contextual features with values in a set $\overline{C_1}$. The sets $C_1$ and $\overline{C_1}$ are complementary sets of contextual feature values.

A second pair of subsets $U(C_2)$ and $\overline{U(C_2)}$ of the set U of observed events is also selected. The subset $U(C_2)$ has contextual features with values in a set $C_2$. The subset $\overline{U(C_2)}$ has contextual features with values in a set $\overline{C_2}$. The sets $C_2$ and $\overline{C_2}$ are complementary sets of contextual feature values. The set $C_2$ differs from the set $C_1$, and the subset $U(C_2)$ differs from the subsets $U(C_1)$ and $\overline{U(C_1)}$.

For each pair of sets $U(C_n)$ and $\overline{U(C_n)}$, where n has a value of at least 1 or 2, the similarity $A[U(C_n)]$ of the values of the symbol features of the observed events in the subset $U(C_n)$ is calculated, and the similarity $A[\overline{U(C_n)}]$ of the values of the symbol features of the observed events in the subset $\overline{U(C_n)}$ is calculated. The combined similarity, $A[U(C_n)]$ and $A[\overline{U(C_n)}]$, is a "goodness of fit" which estimates how well the contextual feature values in the sets $C_n$ and $\overline{C_n}$ explain variations in the values of the symbol features of the observed events.

Next, the set $C_{opt}=C_n$ and $\overline{C_{opt}}=\overline{C_n}$ of contextual feature values associated with the two sets $\overline{U_{opt}}=\overline{U(C_n)}$ and $U_{opt}=U(C_n)$ having the best "goodness of fit" are identified. Thereafter, the observed events are grouped into a first set $U_{opt}$ of events having contextual feature values in the set $C_{opt}$ and a second set $U_{opt}$ of observed events having contextual feature values in set $\overline{C_{opt}}$.

In one aspect of the invention, the symbol feature has at least first and second independent components. Each component has a value.

According to the invention, each event in set U may be the utterance of a phoneme. All of the events $U_p$ in set U, in this example, represent a single phoneme. The contextual feature of each utterance of the phoneme comprises one or more context utterances preceding and/or following the utterance of the phoneme.

Preferably, according to the present invention, a plurality of different pairs of subsets $U(C_n)$ and $\overline{U(C_n)}$ are selected, and a "goodness of fit" is calculated for each pair of subsets.

The symbol feature of each utterance of the phoneme may comprise at least one acoustic feature of each utterance of the phoneme. In this case, the value of the symbol feature is measured by measuring the value of the acoustic feature of the utterance during each of at least two successive time intervals to produce at least two acoustic feature vector signals representing the acoustic feature values. The acoustic feature value of each acoustic feature vector signal is compared to the parameter value of each of a plurality of a prototype vector signals to determine the associated prototype vector signal which is best matched to each acoustic feature vector signal. Label signals representing the prototype vector signals associated with the acoustic feature vector signals are output at coded representations of the values of the components of the symbol feature of the utterance of the phoneme.

The similarity of the values of the symbol features of events in a subset of events may be calculated by counting, for each label identifier and for each utterance of the phoneme in the subset, the number of label signals representing the label identifier to produce a label identifier frequency signal representing the count. Thereafter, for each label identifier an average of the label signal counts is calculated for all utterances in the subset to produce an average count signal. A probability distribution of the label signal count is estimated for each label identifier. The probability distribution has an expected value equal to the average of the label signal count.

For each label identifier and for each utterance of the phoneme in the subset, a probability of observing the count of the label signals representing the label identifier is estimated from the probability distribution of the label signal count. The probabilities of the counts are multiplied for all label identifiers and all utterances in the subset to produce a similarity signal estimating the similarity of the values of the symbol features.

The probability distribution of the label signal count may be, for example, a Poisson probability distribution.

Preferably, the acoustic feature values of all utterances in the set $U_{opt}$ are statistically combined to produce a model of the phoneme when an utterance of the phoneme has a contextual feature value in the set $C_{opt}$. Similarly, the acoustic feature values of all utterances in the set $\overline{U_{opt}}$ are statistically combined to produce a model of the phoneme when an utterance of the phoneme has a contextual feature value in the set $\overline{C_{opt}}$.

According to the present invention, an apparatus for automatically grouping observed events into similar categories and correlating the groups of observed events with different contexts comprises a symbol processor for measuring the value of a symbol feature of each event, and a context processor for measuring the value of a contextual feature of each event. A selection processor selects at least two pairs of subsets with different contextual feature values. A similarity processor calculates the symbol similarity and "goodness of fit" for each pair of subsets. An optimization processor identifies the contextual feature values associated with the pair of subsets having the best "goodness of fit", and a group processor groups the observed events according to these optimum subsets.

The invention is also a method and apparatus for automatic speech recognition. In the method, the value of at least one acoustic feature of an utterance is measured to produce an acoustic feature vector signal representing the acoustic feature value. The utterance represents an unknown sequence of one or more speech units.

A hypothesis model of a hypothesis sequence of one or more speech units is selected. The hypothesis sequence of speech units comprises a candidate speech unit having a contextual feature in the hypothesis sequence of speech units. The contextual feature has a value. The hypothesis model comprises a first candidate model of the candidate speech unit if the value of the contextual feature of the candidate speech unit is in a set $C_{opt}$ of contextual feature values. The hypothesis model comprises a second candidate model different from the first candidate model if the value of the contextual feature of the candidate speech unit is in a set $\overline{C_{opt}}$ of contextual feature values.

From the hypothesis model, the probability that an utterance of the hypothesis sequence of speech units would have an acoustic feature value equal to the acoustic feature value of the utterance of the unknown sequence of speech units is estimated.

In the method and apparatus for automatic speech recognition, the sets $C_{opt}$ and $\overline{C_{opt}}$ of contextual feature value are determined by automatically grouping observed events into similar categories and correlating the groups of observed events with different contexts according to the present invention.

The automatic speech recognition apparatus according to the invention comprises an acoustic processor for measuring the value of at least one acoustic feature of an utterance. A hypothesis processor selects one of at least two alternative hypothesis models of a hypothesis sequence of speech units based on whether the contextual feature value of a candidate speech unit is in a set $C_{opt}$ or $\overline{C_{opt}}$. A detailed match processor estimates, from the selected hypothesis model, the probability that an utterance of the hypothesis sequence of speech units would have an acoustic feature value equal to the acoustic feature value of the utterance of the unknown sequence of speech units. The sets $C_{opt}$ and $\overline{C_{opt}}$ of contextual feature values are determined by a training processor for automatically grouping utterances into similar categories and correlating the groups of utterances with different context according to the present invention.

The method and apparatus according to the present invention are advantageous because they automatically group observed events into similar categories and correlate the group of observed events with different contexts, without requiring a time-consuming clustering step. In particular, the method and apparatus according to the present invention are advantageous in avoiding the clustering step when the observed events have symbol features with at least first and second independent components. Moreover, because the "goodness of fit" is based upon a similarity measurement, it is possible that more accurate groupings can be obtained.

DESCRIPTION OF THE PREFERRED EMBODIMENTS

Figure 1:
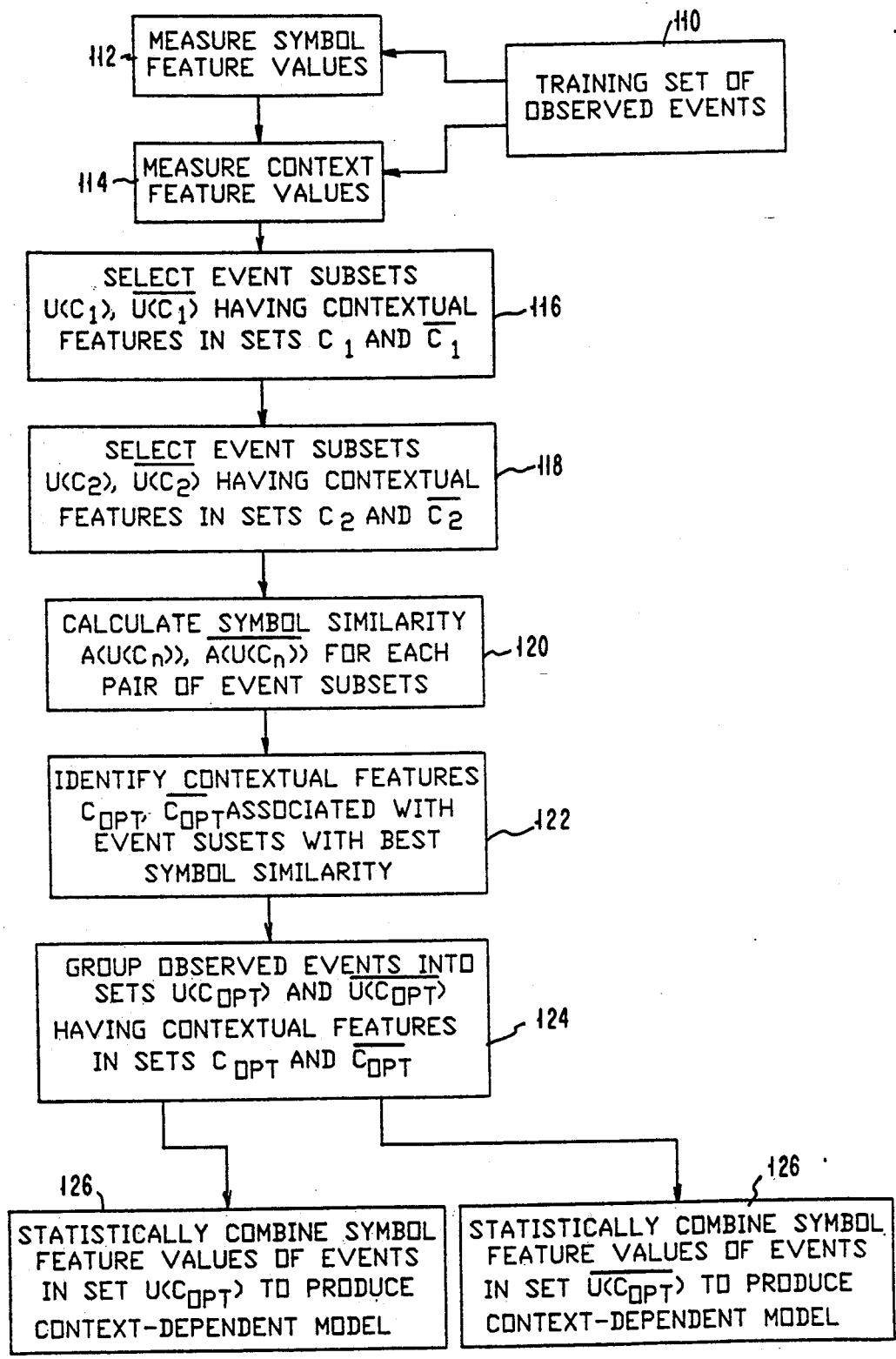
FIG. 1 is a flow chart of the method of automatically grouping observed events into similar categories and correlating the groups of observed events with different contexts according to the present invention.

FIG. 1 is a flow chart of the method of automatically grouping observed events into similar categories and correlating the groups of observed events with different contexts according to the present invention. The method begins with providing a training set U of a plurality of observed events $U_p$ representing the same information in different contexts. (Step 110.) Each observed event has at least one symbol feature having a value and at least one contextual feature having a value.

Each event may be, for example, the utterance of a phoneme. All of the events $U_p$ in the set U represent a single phoneme.

Table 1 lists a hypothetical example of a set of utterances of a phoneme. The events in the set are the utterances of the soft "e" phoneme in the words "towel", "axel", "beg", "power", "neck", "pummel", "wet", "often", "wonder", "step", "get", and "thunder".

TABLE 1

| WORD | UTTERED PHONEME (EVENT) | PHONEME CONTEXT | PHONEME ACOUSTIC LABEL STRING (SYMBOL) |
|---|---|---|---|
| towel | soft "e" | L | 1, 2, 1, 1, 2, 1 |
| axel | soft "e" | L | 2, 1, 2, 1, 1, 1, 1 |
| beg | soft "e" | G | 2, 1, 2 |
| power | soft "e" | R | 1, 1, 2, 1, 1 |
| neck | soft "e" | CK | 2, 1, 2, 2 |
| pummel | soft "e" | L | 1, 1, 2, 2, 1, 1 |
| wet | soft "e" | T | 2, 2, 2, 1 |
| often | soft "e" | N | 1, 2, 2, 2 |
| wonder | soft "e" | R | 2, 1, 1, 1, 2, 1 |
| step | soft "e" | P | 2, 2, 2 |
| get | soft "e" | T | 1, 2, 2, 1, 2 |
| thunder | soft "e" | R | 1, 1, 1, 2, 1, 1, 2 |

The phoneme context is the sound following the uttered phoneme.

Alternatively, the events may be, for example, multiple occurrences of the writing or printing of a single character, such as a letter or a number. Other types of observed events may also be grouped and contexted-related by using the present invention.

Next, the symbol feature value of each event is measured. (Step 112.) Where the event is the utterance of a phoneme, the symbol feature may be, for example, at least one acoustic feature of each utterance of the phoneme.

As shown in the hypothetical example of Table 1, the symbol feature is a string of acoustic labels which represent the acoustic feature of the utterance of the phoneme during each of a succession of time intervals. While this example shows only two acoustic labels having values of "1" or "2", in practice the acoustic feature of each phoneme will be labeled from a set of, for example, 200 labels.

Preferably, the symbol feature of each event has at least first and second independent components. Each component has a value.

In the hypothetical example of Table 1, the acoustic label string is the symbol feature of each uttered phoneme. Each acoustic label in the string is an independent component of the symbol feature. Therefore, in this example the symbol features have from three to seven independent components.

According to the invention, the value of the contextual feature of each event is also measured. (Step 114.) Where the events are utterances of a phoneme, the contextual feature may comprise, for example, one or more utterances preceding or following the utterance of the phoneme.

As shown in Table 1, the contextual feature may be, for example, the uttered phoneme immediately following the soft "e".

In practice, however, the context is defined by the five phonemes immediately preceding and the five phonemes immediately following the phoneme represented by the event.

A set of 54 phonemes may, for example, be used to define the speech units of the English Language.

From the set U of observed events, a pair of subsets $U(C_1)$ and $\overline{U(C_1)}$ are selected. The subset $U(C_1)$ has contextual features with values in a set $C_1$. The subset $\overline{U(C_1)}$ has contextual features with values in a set $\overline{C_1}$. The sets $C_1$ and $\overline{C_1}$ are complementary sets of contextual feature values. (Step 116.)

A pair of subsets $U(C_2)$ and $\overline{U(C_2)}$ are also selected. The subset $U(C_2)$ has contextual features with values in a set $U(C_2)$, and the subset $\overline{U(C_2)}$ has contextual features with values in set $\overline{C_2}$. The sets $C_2$ and $\overline{C_2}$ are complementary sets of contextual feature values. (Step 118.) The set $C_2$ is different from the set $C_1$. The subset $U(C_2)$ is different from the subset $U(C_1)$ and the subset $\overline{U(C_1)}$.

When the subject phoneme is observed in the training set U in a number $N_c$ of different contexts, the number of pairs of sets $C_n$ and $\overline{C_n}$ of different contexts is given by $$\sum_{x=1}^{\text{Int}(\frac{N_c}{2})} \frac{N_c!}{x!(N_c - x)!} \quad [1]$$

Referring again to the hypothetical and simplified example Table 1, the contextual feature values are "L", "G", "R", "CK", "T", "N", and "P". Therefore, the number of $N_c$ of different contextual feature values is seven. Consequently, there are sixty-three pairs of sets $C_n$ and $\overline{C_n}$ of different contextual feature values, and sixty-three pairs of sets $U(C_n)$ and $\overline{U(C_n)}$ of events classified by context.

Table 2 lists all sixty-three sets $C_n$ and $\overline{C_n}$ of different contexts from the twelve training utterances of Table 1. In this example, the set $C_1=\{L, R\}$ and the set $\overline{C_1}=\{G, CK, T, N, P\}$. Therefore, the subset $U(C_1)$ of observed events contains the utterances of the soft "e" phoneme in the set of the words {towel, axel, power, pummel wonder, thunder}. The subset $\overline{U(C_1)}$ contains utterances of the soft "e" in the words {beg, neck, wet, often, step, get}.

TABLE 2

| n | $C_n$ | $\overline{C_n}$ |
|---|---|---|
| 1 | L, R | G, CK, T, N, P |
| 2 | L, G, T | R, CK, N, P |
| 3 | L | R, G, CK, T, N, P |
| 4 | R | L, G, CK, T, N, P |
| 5 | G | R, L, CK, T, N, P |
| 6 | CK | R, G, L, T, N, P |
| 7 | T | R, G, CK, L, N, P |
| 8 | N | R, G, CK, T, L, P |
| 9 | P | R, G, CK, T, N, L |
| 10 | L, G | R, CK, T, N, P |
| 11 | L, CK | R, G, T, N, P |
| 12 | L, T | R, G, CK, N, P |
| 13 | L, N | R, G, CK, T, P |
| 14 | L, P | R, G, CK, T, N |
| 15 | R, G | L, CK, T, N, P |
| 16 | R, CK | L, G, T, N, P |
| 17 | R, T | L, CK, G, N, P |
| 18 | R, N | L, CK, T, G, P |
| 19 | R, P | L, CK, T, N, G |
| 20 | G, CK | L, R, T, N, P |
| 21 | G, T | L, R, CK, N, P |
| 22 | G, N | L, R, T, CK, P |
| 23 | G, P | L, R, T, N, CK |
| 24 | CK, T | L, R, G, N, P |
| 25 | CK, N | L, R, G, T, P |
| 26 | CK, P | L, R, G, N, T |
| 27 | T, N | L, R, G, CK, P |
| 28 | T, P | L, R, G, CK, N |
| 29 | N, P | L, R, G, CK, T |
| 30 | L, R, G | CK, T, N, P |
| 31 | L, R, CK | G, T, N, P |
| 32 | L, R, T | CK, G, N, P |
| 33 | L, R, N | CK, T, G, P |
| 34 | L, R, P | CK, T, N, G |
| 35 | L, G, CK | R, T, N, P |
| 36 | L, G, N | R, T, CK, P |
| 37 | L, G, P | R, T, N, CK |
| 38 | L, CK, T | R, G, N, P |
| 39 | L, CK, N | R, G, T, P |
| 40 | L, CK, P | R, G, N, T |
| 41 | L, T, N | R, G, CK, P |
| 42 | L, T, P | R, G, CK, N |
| 43 | L, N, P | R, G, CK, T |
| 44 | R, G, CK | L, T, N, P |
| 45 | R, G, T | L, CK, N, P |
| 46 | R, G, N | L, T, CK, P |
| 47 | R, G, P | L, T, N, CK |
| 48 | R, CK, T | L, G, N, P |
| 49 | R, CK, N | L, G, T, P |
| 50 | R, CK, P | L, G, N, T |
| 51 | R, T, N | L, G, CK, P |
| 52 | R, T, P | L, G, CK, N |
| 53 | R, N, P | L, G, CK, T |
| 54 | G, CK, T | L, R, N, P |
| 55 | G, CK, N | L, R, T, P |
| 56 | G, CK, P | L, R, N, T |
| 57 | G, T, N | L, R, CK, P |
| 58 | G, T, P | L, R, CK, N |
| 59 | G, N, P | L, R, CK, T |
| 60 | CK, T, N | L, R, G, P |
| 61 | CK, T, P | L, R, G, N |
| 62 | CK, N, P | L, R, G, T |
| 63 | T, N, P | L, R, G, CK |

Also in this example, the contextual feature value set $C_2=\{L, G, T\}$, and the contextual feature value set $\overline{C_2}=\{R, CK, N, P\}$. Therefore, the subset $U(C_2)$ contains utterances of the soft "e" phoneme in the words {towel, axel, beg, pummel, wet, get}, and the subset $\overline{U(C_2)}$ contains utterances of the soft "e" phoneme in the words {power, neck, often, wonder, step, thunder}.

After at least two pairs of subsets of observed events are selected, for each pair of subsets the similarity $A[U(C_n)]$ of the values of the symbol features of the observed events in the subset $U(C_n)$ are calculated, and the similarity $A[\overline{U(C_n)}]$ of the values of the symbol features of the observed events in the subset $\overline{U(C_n)}$ are calculated. (Step 120.) The combination of $A[U(C_n)]$ and $A[\overline{U(C_n)}]$ is a "goodness of fit" which estimates how well the contextual feature values in the sets $C_n$ and $\overline{C_n}$ explain variations in the values of the symbol features of the observed events.

After calculating the "goodness of fit" for each pair of subsets, the sets $C_{opt}=C_n$ and $\overline{C_{opt}}=\overline{C_n}$ of contextual feature values associated with the two sets $U_{opt}=U(C_n)$ and $\overline{U_{opt}}=\overline{U(C_n)}$ having the best "goodness of fit" are identified. (Step 122.)

In this example, all sixty-three pairs of subsets $U(C_n)$ and $\overline{U(C_n)}$ having contextual features with values in sets $C_n$ and $\overline{C_n}$ shown in Table 2 could be selected. The similarities and "goodness of fit" could be calculated for all of these sets and the best "goodness of fit" would be identified. However, in practice there will be too many pairs of subsets to calculate the similarities and "goodness of fit" for all pairs of subsets.

In this case, only the most promising pairs of subsets are selected, either manually or automatically, according to any chosen criteria.

Figure 2:
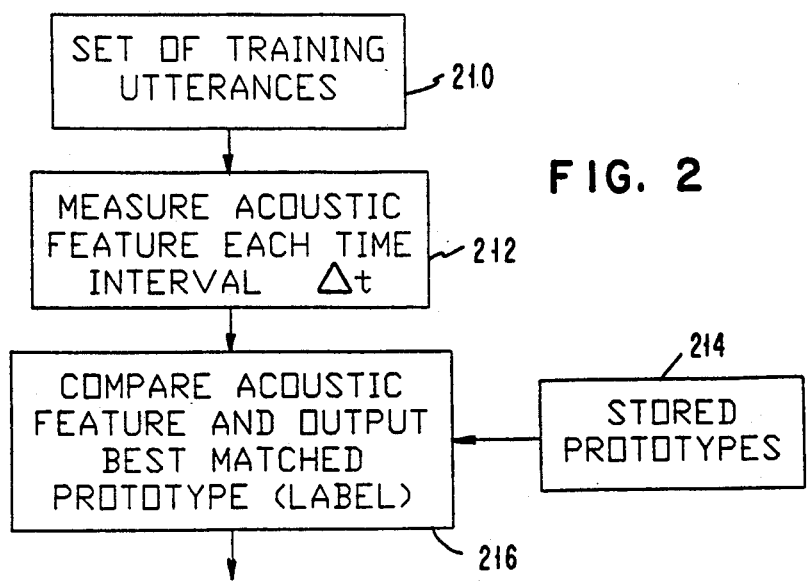
FIG. 2 is a flow chart of an example of a method of measuring the acoustic feature value (symbol feature value) of an utterance of a phoneme (the observed event).

FIG. 2 is a flow chart of the step of measuring the value of the symbol feature (acoustic feature) of an utterance of the phoneme. First, the value of at least one acoustic feature of the utterance 210 is measured during each of at least two successive time intervals to produce at least two acoustic feature vector signals representing the acoustic feature values. (Step 212.) In practice, each acoustic feature is a measured energy level of the utterance in a selected frequency band.

A plurality of prototype vector signals are stored. (Step 214.) In practice, there may be up to two-hundred different prototype vector signals, each having at least one parameter value and having a unique label identifier.

The acoustic feature value of each acoustic feature vector signal is compared to the parameter values of the prototype vector signals to determine the associated prototype vector signal which is best matched to each acoustic feature vector signal. (Step 216.) A string of label signals representing the label identifiers of the prototype vector signals associated with the acoustic feature vector signals are output as a coded representation of the value of the symbol (acoustic) feature of the utterance of the phoneme. Each label signal in the string is an independent component of the symbol feature.

Figure 3:
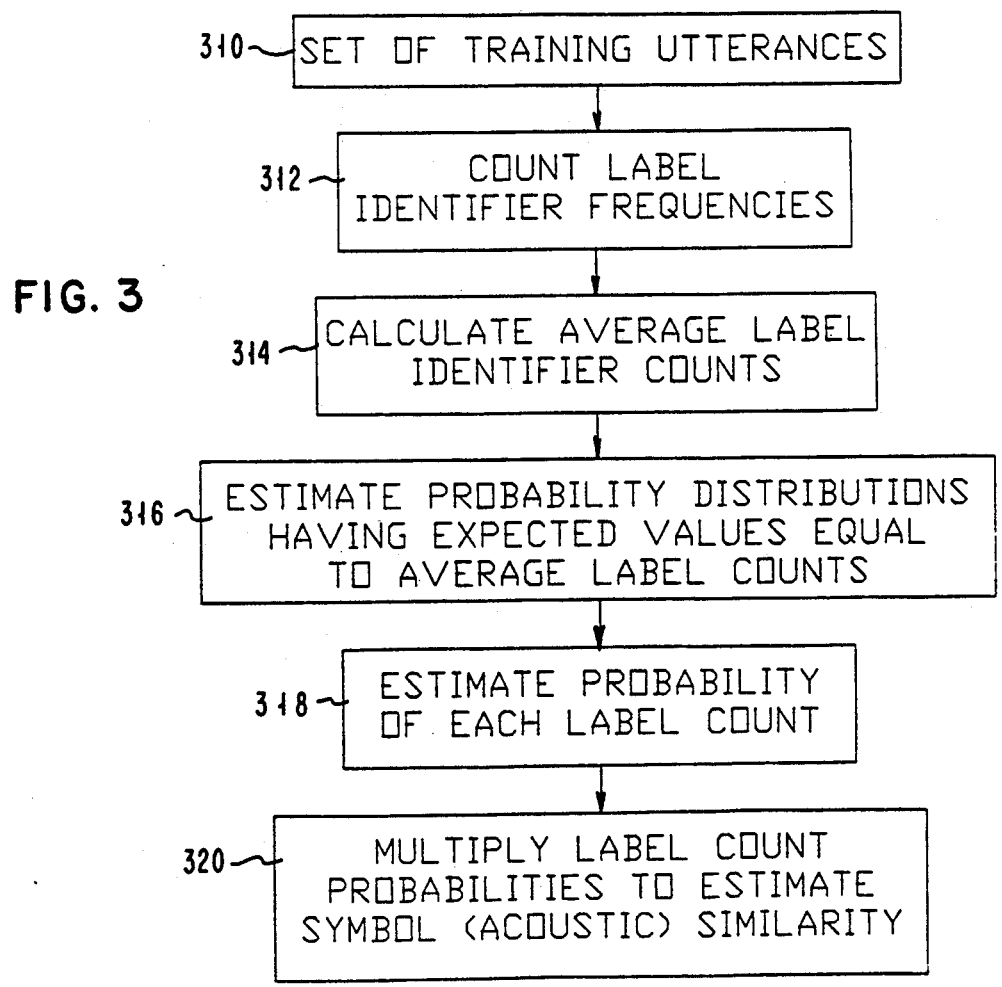
FIG. 3 is a flow chart of an example of a method of calculating the acoustic (symbol) similarity for a subset of utterances.

FIG. 3 is a flow chart of an example of the calculation of the similarity of the values of the symbol features of the events in a subset of events. First, for each label identifier and for each utterance 310 of the phoneme in the subset, the number of label signals representing the label identifier is counted to produce a label identifier frequency signal representing the count. (Step 312.)

Tables 3-6 show the label 1 counts and the label 2 counts for each utterance in the training set of utterances. For example, the acoustic label string corresponding to the soft "e" phoneme in the word "towel"

is (1,2,1,1,2,1). Therefore, the label 1 count ($f_1$) is 4, and the label 2 count ($f_2$) is 2.

TABLE 3

Subset $U(C_1)$
$C_1 = \{L, R\}$

| WORD | UTTERED PHONEME (EVENT) | PHONEME CONTEXT | PHONEME ACOUSTIC LABEL STRING (SYMBOL) | LABEL 1 COUNT ($f_1$) | LABEL 2 COUNT ($f_2$) | $P(f_1, \mu_1)$ | $P(f_2, \mu_2)$ |
|---|---|---|---|---|---|---|---|
| towel | soft "e" | L | 1, 2, 1, 1, 2, 1 | 4 | 2 | −2.37473 | −1.89600 |
| axel | soft "e" | L | 2, 1, 2, 1, 1, 1, 1 | 5 | 2 | −2.58118 | −1.89600 |
| power | soft "e" | R | 1, 1, 2, 1, 1 | 4 | 1 | −2.37473 | −1.77047 |
| pummel | soft "e" | L | 1, 1, 2, 2, 1, 1 | 4 | 2 | −2.37473 | −1.89600 |
| wonder | soft "e" | R | 2, 1, 1, 1, 2, 1 | 4 | 2 | −2.37473 | −1.89600 |
| thunder | soft "e" | R | 1, 1, 1, 2, 1, 1, 2 | 5 | 2 | −2.58118 | −1.89600 |
| Expected Frequency ($\mu_1, \mu_2$) | | | | 4.33 | 1.83 | | |
| Subtotals | | | | | | −14.6612 | −11.2504 |

$A[U(C_1)] = -25.9117$ $$P(f_1, \mu_1) = f_1 \log(\mu_1) - \frac{\mu_1}{\ln 2} - \log(f_1!)$$

$$P(f_2, \mu_2) = f_2 \log(\mu_2) - \frac{\mu_2}{\ln 2} - \log(f_2!)$$

TABLE 4

Subset $\overline{U(C_1)}$ $\overline{C_1} = \{G, CK, T, N, P\}$

| WORD | UTTERED PHONEME (EVENT) | PHONEME CONTEXT | PHONEME ACOUSTIC LABEL STRING (SYMBOL) | LABEL 1 COUNT ($f_1$) | LABEL 2 COUNT ($f_2$) | $P(f_1, \mu_1)$ | $P(f_2, \mu_2)$ |
|---|---|---|---|---|---|---|---|
| beg | soft "e" | G | 2, 1, 2 | 1 | 2 | −1.44269 | −2.08263 |
| neck | soft "e" | CK | 2, 1, 2, 2 | 1 | 3 | −1.44269 | −2.16509 |
| wet | soft "e" | T | 2, 2, 2, 1 | 1 | 3 | −1.44269 | −2.16509 |
| often | soft "e" | N | 1, 2, 2, 2 | 1 | 3 | −1.44269 | −2.16509 |
| step | soft "e" | P | 2, 2, 2 | 0 | 3 | −1.44269 | −2.16509 |
| get | soft "e" | T | 1, 2, 2, 1, 2 | 2 | 3 | −2.44269 | −2.16509 |
| Expected Frequency ($\mu_1, \mu_2$) | | | | 1.00 | 2.83 | | |
| Subtotals | | | | | | −9.65617 | −12.9081 |

$A[\overline{U(C_1)}] = 22.5642$ $A[U(C_1)] + A[\overline{U(C_1)}] = -48.4760$ $$P(f_1, \mu_1) = f_1 \log(\mu_1) - \frac{\mu_1}{\ln 2} - \log(f_1!)$$

$$P(f_2, \mu_2) = f_2 \log(\mu_2) - \frac{\mu_2}{\ln 2} - \log(f_2!)$$

TABLE 5

Subset $U(C_2)$
$C_2 = \{L, G, T\}$

| WORD | UTTERED PHONEME (EVENT) | PHONEME CONTEXT | PHONEME ACOUSTIC LABEL STRING (SYMBOL) | LABEL 1 COUNT ($f_1$) | LABEL 2 COUNT ($f_2$) | $P(f_1, \mu_1)$ | $P(f_2, \mu_2)$ |
|---|---|---|---|---|---|---|---|
| towel | soft "e" | L | 1, 2, 1, 1, 2, 1 | 4 | 2 | −2.66259 | −1.92150 |
| axel | soft "e" | L | 2, 1, 2, 1, 1, 1, 1 | 5 | 2 | −3.48202 | −1.92150 |
| beg | soft "e" | G | 2, 1, 2 | 1 | 2 | −2.58513 | −1.92150 |
| pummel | soft "e" | L | 1, 1, 2, 2, 1, 1 | 4 | 2 | −2.66259 | −1.92150 |
| wet | soft "e" | T | 2, 2, 2, 1 | 1 | 3 | −2.58513 | −2.28407 |
| get | soft "e" | T | 1, 2, 2, 1, 2 | 2 | 3 | −2.08263 | −2.28407 |
| Expected Frequency ($\mu_1, \mu_2$) | | | | 2.83 | 2.33 | | |
| Subtotals | | | | | | −16.0601 | −12.2541 |

$A[U(C_2)] = -28.3142$

TABLE 5-continued $$P(f_1,\mu_1) = f_1 \log(\mu_1) - \frac{\mu_1}{\ln 2} - \log(f_1!)$$

$$P(f_2,\mu_2) = f_2 \log(\mu_2) - \frac{\mu_2}{\ln 2} - \log(f_2!)$$

TABLE 6

Subset $\overline{U(C_1)}$ $\overline{C_2}$ = {R, CK, N, P}

| WORD | UTTERED PHONEME (EVENT) | PHONEME CONTEXT | PHONEME ACOUSTIC LABEL STRING (SYMBOL) | LABEL 1 COUNT ($f_1$) | LABEL 2 COUNT ($f_2$) | $P(f_1, \mu_1)$ | $P(f_2, \mu_2)$ |
|---|---|---|---|---|---|---|---|
| power | soft "e" | R | 1, 1, 2, 1, 1 | 4 | 1 | −2.90398 | −2.14389 |
| neck | soft "e" | CK | 2, 1, 2, 2 | 1 | 3 | −2.28480 | −2.28407 |
| often | soft "e" | N | 1, 2, 2, 2 | 1 | 3 | −2.28480 | −2.28407 |
| wonder | soft "e" | R | 2, 1, 1, 1, 2, 1 | 4 | 2 | −2.90398 | −1.92150 |
| step | soft "e" | P | 2, 2, 2 | 0 | 3 | −3.60673 | −2.28407 |
| thunder | soft "e" | R | 1, 1, 1, 2, 1, 1, 2 | 5 | 2 | −3.90398 | −1.92150 |
| Expected Frequency ($\mu_1$, $\mu_2$) | | | | 2.50 | 2.33 | | |
| Subtotals | | | | | | −17.8883 | −12.8391 |

$A[\overline{U(C_2)}] = -30.7274$ $A[U(C_2)] + A[\overline{U(C_2)}] = -59.0417$ $$P(f_1,\mu_1) = f_1 \log(\mu_1) - \frac{\mu_1}{\ln 2} - \log(f_1!)$$

$$P(f_2,\mu_2) = f_2 \log(\mu_2) - \frac{\mu_2}{\ln 2} - \log(f_2!)$$

---

For each label identifier, an average of the label signal counts is calculated for all utterances in the subset to produce an average count signal. (Step 314.) As shown in Tables 3-6, the average label 1 count ($\mu_1$) for the subset $U(C_1)$ is 4.33, and the average label 2 count ($\mu_2$) for the subset $U(C_1)$ is 1.83. The other average label counts are shown in Tables 4-6.

For each label identifier, a probability distribution of the label signal count is estimated. (Step 316.) The probability distribution has an expected value equal to the average of the label signal counts. Preferably, the probability distribution is a Poisson probability distribution. Other alternative probability distributions, such as the multinomial probability distribution, may be used.

For each label identifier and for each utterance of the phoneme in the subset, a probability of observing the count of the label signals representing the label identifier is estimated from the probability distribution of the label signal count. (Step 318.)

Finally, for all label identifiers and all utterances in the subset, the probabilities of the counts are multiplied to produce a similarity signal estimating the similarity of the values of the symbol feature. (Step 320.)

The similarity calculations shown in Tables 3-6 are based on Poisson probability distributions. Assuming that the labels strings are generated by a Poisson source having an expected value of $\mu_i$, then the probability of obtaining the count $f_i$ for a label i is given by $$\text{Prob}(f_i) = \frac{\mu_i^{f_i} e^{-\mu_i}}{f_i!} \quad [2]$$

Taking logarithms (base 2) of both sides, we obtain $$P(f_i, \mu_i) = \log \text{Prob}(f_i) = f_i \log \mu_i - \frac{\mu_i}{\ln 2} - \log(f_i!) \quad [3]$$

Since the logarithm of the product of the probabilities of the counts is equal to the sum of the logarithms of the probabilities of the counts, the similarity of the acoustic feature values of the uttered phoneme in a subset is given by $$\sum_{i=1}^{F} f_i \log \mu_i - \mu_i - \log(f_i!) \quad [4]$$

where F is the number of different labels (F=2 in this example). The logarithms $P(f_i, \mu_i)$ of the probabilities are calculated and totalled for each subset $U(C_1)$, $\overline{U(C_1)}$, $U(C_2)$, and $\overline{U(C_2)}$ in Tables 3-6, respectively.

The "goodness of fit" of each pair of subsets is obtained by combining the similarity $A[U(C_n)]$ and the similarity $A[\overline{U(C_n)}]$. Since in this example the similarities are calculated as logarithms, the similarities are combined by addition. The "goodness of fit" is $A[U(C_n)] + A[\overline{U(C_n)}]$. Alternatively, if the similarities were calculated as probabilities, instead of logarithms of probabilities, the similarities would be combined by multiplication. The "goodness of fit" would then be $A[U(C_n)] \times A[\overline{U(C_n)}]$.

Since the subsets $U(C_1)$ and $\overline{U(C_1)}$ have better (in this case, higher is better) combined similarity than the subsets $U(C_2)$ and $\overline{U(C_2)}$, the sets $C_1$ and $\overline{C_1}$ of contextual feature values are selected as the basis for grouping the observed events. (FIG. 1, Step 124.)

Preferably, the method of grouping events into similar categories and correlating the groups with different contexts is repeated for each resulting output group of observed events $U_{opt}$ and $\overline{U_{opt}}$ to obtain smaller groups of events having greater similarity and greater context correlation. The process would be repeated on each output group until no significant improvement is obtained. For example, the process would be repeated on each output group until the increase in the "goodness of fit" fell below a selected threshold value.

For each terminal subset (i.e. each subset which is not further split) of acoustically similar, context-related utterances of a phoneme, the acoustic feature values of all utterances in the subset are statistically combined to produce a model of the phoneme when an utterance of the phoneme has the associated contextual feature value. (FIG. 1, Step 126.) The process of statistically combining the acoustic feature values to produce a phoneme model is described in, for example, an article by L. R. Bahl, et al entitled "Acoustic Markov Models Used in the Tangora Speech Recognition System" (*Proceedings of the* 1988 *IEEE International Conference on Acoustics, Speech, and Signal Processing*, pages 497-500, 1988.)

Figure 4:
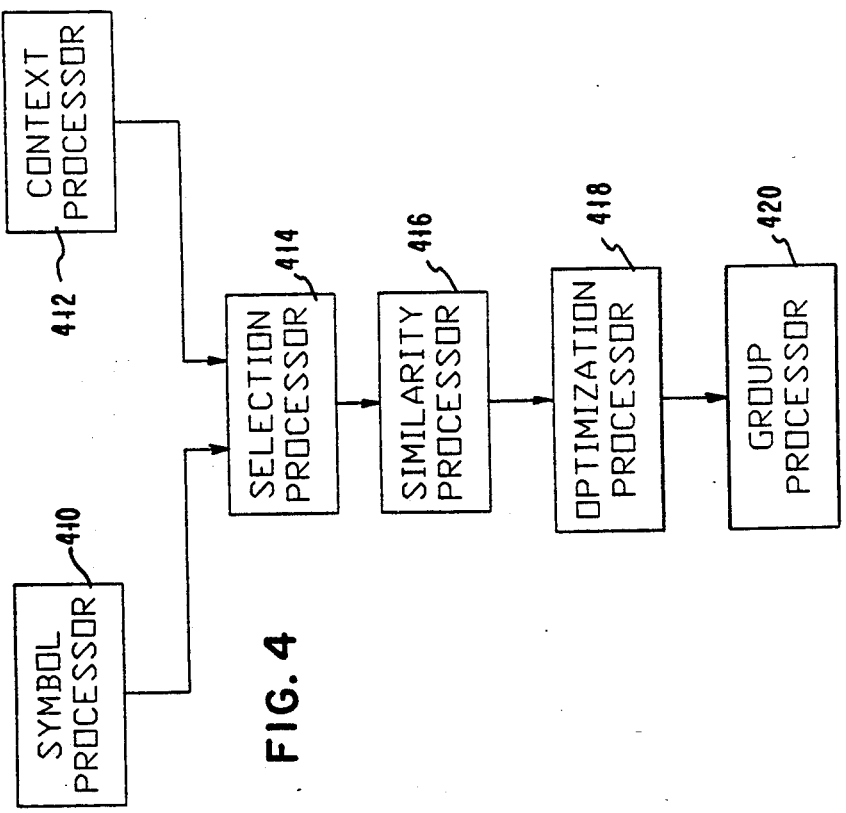
FIG. 4 is a block diagram of an apparatus according to the invention for automatic grouping observed events into similar categories and correlating the groups of observed events with different contexts.

FIG. 4 is a block diagram of an apparatus for automatically grouping observed events into similar categories and correlating the groups of observed events with different contexts according to the present invention. The apparatus includes a symbol processor 410 for measuring the value of the symbol feature of each event, and a context processor 412 for measuring the value of the contextual feature of each event. A selection processor 414 selects pairs of subsets $U(C_1)$, $\overline{U(C_1)}$, $U(C_2)$, and $\overline{U(C_2)}$. A similarity processor 416 calculates the similarity of the values of the symbol features of the observed events in each subset, and calculates the "goodness of fit" for each pair of subsets.

An optimization processor 418 identifies the contextual feature value subsets associated with the event subsets having the best "goodness of fit". A group processor 420 groups the observed events according to these contextual feature values.

Figure 5:
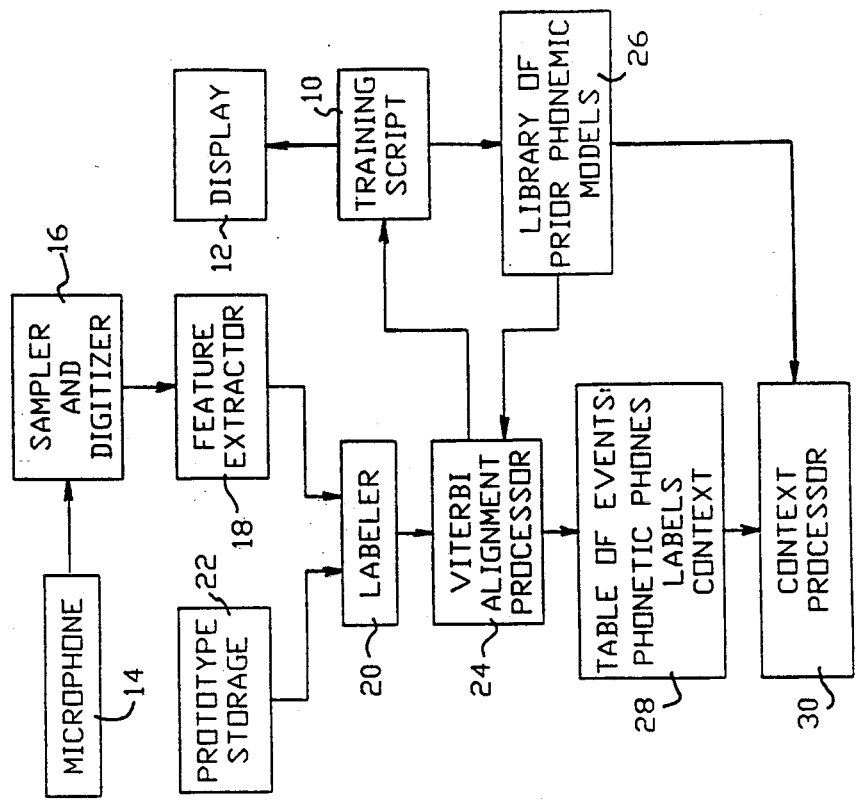
FIG. 5 is a block diagram of the construction of the symbol processor and context processor of FIG. 4.

FIG. 5 is a block diagram showing the symbol processor and the context processor where each event is the utterance of, for example, a phoneme.

A training script stored in block 10 is displayed on a display 12. The training script is read from display 12 and is uttered into microphone 14. The output of microphone 14 is sampled and digitized in block 16. The sampled and digitized signal enters feature extractor 18 which measures the energy of the signal in each of a number of different frequency bands during each of a series of time intervals to produce a series of acoustic feature vector signals representing the acoustic feature values.

A labeler 20 compares the acoustic feature value of each acoustic feature vector signal to the parameter values of prototype vector signals in prototype storage 22 to determine the associated prototype vector signal which is best matched to each acoustic feature vector signal. The labeler 20 outputs a string of label signals representing the label identifiers of the prototype vector signals associated with the acoustic feature vector signals as a coded representation of the values of the symbol feature of the utterance of the phoneme. Each label signal in the string is an independent component of the symbol feature.

A Viterbi alignment processor 24 retrieves a string of phonemic models from a model library 26 corresponding to the training script 10. Processor 24 then aligns the string of models against the string of labels output from the labeler 20. As a result, each phonemic model is aligned against a substring of labels corresponding to the uttered phoneme. The results of the alignment are stored in a table of events 28.

From the training script 10, and from the library of phonemic models 26, a context processor 30 determines the context of each phoneme in the training script. The context is also stored in table 28.

Figure 6:
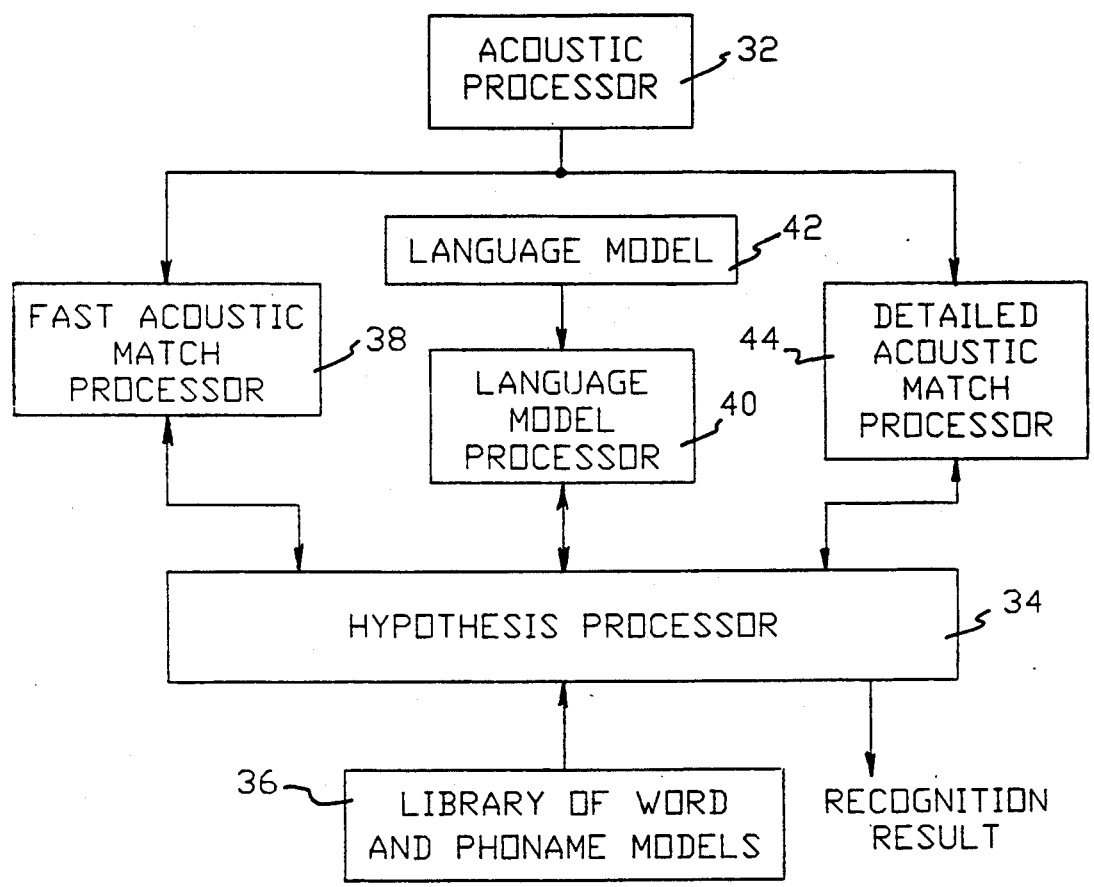
FIG. 6 is a block diagram of an automatic speech recognition apparatus according to the present invention.

FIG. 6 is a block diagram of an automatic speech recognition apparatus according to the present invention. An acoustic processor 32 measures the value of at least one acoustic feature of an utterance to produce an acoustic feature vector signal representing the acoustic feature value. The utterance represents an unknown sequence of one or more speech units.

The apparatus further includes a hypothesis processor 34 for generating hypotheses as to the identification of the unknown sequence of speech units which produced the utterance.

For example, initially the hypothesis processor 34 will propose every word from the library of word and phoneme models 36 to the fast acoustic match processor 38. The fast acoustic match processor 38 will estimate, for each word model, the probability that an utterance of the word would have an acoustic feature value equal to the feature value of at least a portion of the utterance of the unknown sequence of speech units.

The hypothesis processor 34 will then select all words having a fast acoustic match probability above a selected threshold as candidates for the language model processor 40.

The language model processor 40 then estimates for, each remaining word, the probability that the word is in the unknown sequence of speech units based on a language model 42, and based on hypotheses of preceding and following words. Hypotheses having probabilities below a selected threshold are rejected.

Hypotheses having combined fast acoustic match processor and language model processor scores above a selected threshold are then presented to a detailed acoustic match processor 44.

For the detailed match processor 44, hypothesis processor 34 selects a hypothesis model of a hypothesis sequence of one or more speech units. The sequence of speech units may be a sequence of words. The hypothesis sequence of speech units comprises a candidate speech unit, such as a candidate phoneme. The candidate speech unit has a context in the hypothesis sequence of speech units. The context comprising, for example, preceding and following phonemes in the hypothesis.

The hypothesis model comprises a first candidate model of the candidate speech unit if the value of the contextual feature of the candidate speech unit is in a set $C_{opt}$ of contextual feature values. The hypothesis model comprises a second candidate model different from the first candidate model if the value of the contextual feature of the candidate speech unit is in a set $\overline{C_{opt}}$ of contextual feature values.

Returning to the hypothetical example of Tables 1-6, we found $C_{opt}=\{L, R\}$ and $\overline{C_{opt}}=\{G, CK, T, N, P\}$. Therefore, if the phoneme context in the hypothesis is "L" or "R", the hypothesis processor 34 will select a candidate model of the soft "e" generated from the utterances of the words "towel", "axel", "power", "pummel", "wonder", and "thunder". Alternatively, if the phoneme context is "G", "CK", "T", "N", or "P"

then a context-dependent model of the soft "e" generated from the utterances of the words "beg", "neck", "wet", "often", "step", and "get" will be selected from the library 36.

Finally, the model selected by the hypothesis processor 34 will be presented to the detailed match processor 44 for estimating, from the selected model, the probability that an utterance of the hypothesis sequence of speech units would have an acoustic feature value equal to the acoustic feature value of the utterance of the unknown sequence of speech units.

As described above, the method according to the present invention of automatically grouping observed events into similar categories and correlating the groups of observed events with different contexts can be performed on each output set $U_{opt}$ and $\overline{U_{opt}}$ in order to extract context-dependent groups with greater similarity of the values of the symbol features of the observed events. When the symbol feature values are acoustic label strings selected by Viterbi alignment, it is possible that some acoustic label strings might be misaligned so that some of the label strings will be incorrect.

In order to remove erroneous label strings, any terminal output set $U_{opt}$ or $\overline{U_{opt}}$ containing a low number of label strings (for example, less than five label strings) is discarded as most likely containing erroneous data.

For each other terminal output set of acoustic label strings associated with a set of contextual feature values, each acoustic label string is tested in the following manner.

For a label string s in a set S of acoustic label strings, the number of occurrences of a label i in that string is denoted by $s_i$. The string s is removed from S, and a Poisson model is fit to the rest of the strings in S. The parameters of this Poisson model, $\mu_i$, $i=1, \ldots, F$, are given by $$\mu_i = \frac{1}{N-1} \sum_{t \in (S-s)} t_i \quad [5]$$

where N is the number of strings in S. The probability of observing the string s given this Poisson model is $$\text{Prob}(s) = \prod_{i=1}^{F} \frac{\mu_i^{s_i} e^{-\mu_i}}{s_i!} \quad [6]$$

If this probability is below a selected threshold, the string s is discarded.

After repeating the process for all strings in S, a context-dependent model is constructed from the remaining strings in S.

We claim:

1. A method of automatically grouping utterances of a phoneme into similar categories and correlating the groups of utterances with different contexts, said method comprising the steps of:

providing a training script comprising a series of phonemes, said training script comprising a plurality of occurrences of a selected phoneme, each occurrence of the selected phoneme having a context of one or more other phonemes preceding or following the selected phoneme in the training script;

measuring the value of an acoustic feature of an utterance of the phonemes in the training script during each of a series of time intervals to produce a series of acoustic feature vector signals representing the acoustic feature values of the utterance, each acoustic feature vector signal corresponding to an occurrence of a phoneme in the training script;

selecting a pair of first and second subsets of the set of occurrences of the selected phoneme in the training script, each occurrence of the selected phoneme in the first subset having a first context, each occurrence of the selected phoneme in the second subset having a second context different from the first context;

selecting a pair of third and fourth subsets of the set of occurrences of the selected phoneme in the training script, each occurrence of the selected phoneme in the third subset having a third context different from the first and second contexts, each occurrence of the selected phoneme in the fourth subset having a fourth context different from the first, second, and third contexts;

for each pair of subsets, determining the similarity of the acoustic feature values of the acoustic feature vector signals corresponding to the occurrences of the selected phoneme in one subset of the pair, and determining the similarity of the acoustic feature values of the acoustic feature vector signals corresponding to the occurrences of the selected phoneme in the other subset of the pair, the combined similarities for both subsets in the pair being a "goodness of fit" which estimates how well the contexts of the selected phoneme explain variations in the acoustic feature values of the utterances of the selected phoneme;

identifying first and second best contexts associated with the pair of subsets having the best "goodness of fit"; and grouping the utterances of the selected phoneme into a first output set of utterances of the selected phoneme having the first best context, and grouping the utterances of the selected phoneme into a second output set of utterances of the selected phoneme having the second best context.

2. A method as claimed in claim 1, characterized in that the acoustic feature has at least first and second independent components, each component having a value.

3. A method as claimed in claim 2, further comprising the steps of:

storing a plurality of prototype vector signals, each prototype vector signal having at least one parameter value and having a unique label identifier;

comparing the acoustic feature value of each acoustic feature vector signal to the parameter values of the prototype vector signals to determine the associated prototype vector signal which is best matched to each acoustic feature vector signal; and outputting a series of label signals representing the label identifiers of the prototype vector signals associated with the acoustic feature vector signals as a coded representation of the acoustic feature values of the utterance of the training script.

4. A method as claimed in claim 3, further comprising the steps of:

combining the acoustic feature values of all utterances in the first output set of utterances of the selected phoneme to produce a model of the phoneme when an utterance of the phoneme has the first best context, and combining the acoustic feature values of all utterances in the second output set of utterances of the selected phoneme to produce a model of the phoneme when an utterance of the phoneme has the second best context.

5. An apparatus for automatically grouping utterances of a phoneme into similar categories and correlating the groups of utterances with different contexts, said apparatus comprising:

means for storing a training script comprising a series of phonemes, said training script comprising a plurality of occurrences of a selected phoneme, each occurrence of the selected phoneme having a context of one or more other phonemes preceding or following the selected phoneme in the training script;

an acoustic processor for measuring the value of an acoustic feature of an utterance of the phonemes in the training script during each of a series of time intervals to produce a series of acoustic feature vector signals representing the acoustic feature values of the utterance, each acoustic feature vector signal corresponding to an occurrence of a phoneme in the training script;

means for selecting a pair of first and second subsets of the set of occurrences of the selected phoneme in the training script, each occurrence of the selected phoneme in the first subset having a first context, each occurrence of the selected phoneme in the second subset having a second context different from the first context;

means for selecting a pair of third and fourth subsets of the set of occurrences of the selected phoneme in the training script, each occurrence of the selected phoneme in the third subset having a third context different from the first and second contexts, each occurrence of the selected phoneme in the fourth subset having a fourth context different from the first, second, and third contexts;

means for determining, for each pair of subsets, the similarity of the acoustic feature values of the acoustic feature vector signals corresponding to the occurrences of the selected phoneme in one subset of the pair, and determining the similarity of the acoustic feature values of the acoustic feature vector signals corresponding to the occurrences of the selected phoneme in the other subset of the pair, the combined similarities for both subsets in the pair being a "goodness of fit" which estimates how well the contexts of the selected phoneme explain variations in the acoustic feature values of the utterances of the selected phoneme;

means for identifying first and second best contexts associated with the pair of subsets having the best "goodness of fit"; and means for grouping the utterances of the selected phoneme into a first output set of utterances of the selected phoneme having the first best context, and grouping the utterances of the selected phoneme into a second output set of utterances of the selected phoneme having the second best context.

6. An apparatus as claimed in claim 5, characterized in that the acoustic feature has at least first and second independent components, each component having a value.

7. An apparatus as claimed in claim 6, further comprising:

means for storing a plurality of prototype vector signals, each prototype vector signal having at least one parameter value and having a unique label identifier;

means for comparing the acoustic feature value of each acoustic feature vector signal to the parameter values of the prototype vector signals to determine the associated prototype vector signal which is best matched to each acoustic feature vector signal; and means for outputting a series of label signals representing the label identifiers of the prototype vector signals associated with the acoustic feature vector signals as a coded representation of the acoustic feature values of the utterance of the training script.

8. An apparatus as claimed in claim 7, further comprising:

means for combining the acoustic feature values of all utterances in the first output set of utterances of the selected phoneme to produce a model of the phoneme when an utterance of the phoneme has the first best context, and means for combining the acoustic feature values of all utterances in the second output set of utterances of the selected phoneme to produce a model of the phoneme when an utterance of the phoneme has the second best context.

9. A method of automatic speech recognition, said method comprising the steps of:

measuring the value of at least one acoustic feature of an utterance to be recognized during each of a series of time intervals to produce a series of acoustic feature vector signals representing the acoustic feature values of the utterance;

selecting a hypothesis model of a hypothesis sequence of one or more phonemes, said hypothesis sequence of phonemes comprising a candidate phoneme, said candidate phoneme having a context of one or more other phonemes preceding or following the candidate phoneme in the hypothesis sequence of phonemes, said hypothesis model comprising a first candidate model of the candidate phoneme if the context of the candidate phoneme is a first best context, said hypothesis model comprising a second candidate model of the candidate phoneme if the context of the candidate phoneme is a second best context; and estimating, from the hypothesis model, the probability that an utterance of the hypothesis sequence of phonemes would have a series of acoustic feature values equal to the series of acoustic feature values of the utterance to be recognized;

characterized in that the first and second best contexts are determined by the steps of:

providing a training script comprising a series of phonemes, said training script comprising a plurality of occurrences of the candidate phoneme, each occurrence of the candidate phoneme having a context of one or more other phonemes preceding or following the candidate phoneme in the training script;

measuring the value of an acoustic feature of an utterance of the phonemes in the training script during each of a series of time intervals to produce a series of acoustic feature vector signals representing the acoustic feature values of the utterance, each acoustic feature vector signal corresponding to an occurrence of a phoneme in the training script;

selecting a pair of first and second subsets of the set of occurrences of the candidate phoneme in the training script, each occurrence of the candidate phoneme in the first subset having a first context, each occurrence of the candidate phoneme in the second subset having a second context different from the first context;

selecting a pair of third and fourth subsets of the set of occurrences of the candidate phoneme in the training script, each occurrence of the candidate phoneme in the third subset having a third context different from the first and second contexts, each occurrence of the candidate phoneme in the fourth subset having a fourth context different from the first, second, and third contexts;

for each pair of subsets, determining the similarity of the acoustic feature values of the acoustic feature vector signals corresponding to the occurrences of the candidate phoneme in one subset of the pair, and determining the similarity of the acoustic feature values of the acoustic feature vector signals corresponding to the occurrences of the candidate phoneme in the other subset of the pair, the combined similarities for both subsets in the pair being a "goodness of fit" which estimates how well the contexts of the candidate phoneme explain variations in the acoustic feature values of the utterances of the candidate phoneme;

identifying first and second best contexts associated with the pair of subsets having the best "goodness of fit"; and grouping the utterances of the candidate phoneme into a first output set of utterances of the candidate phoneme having the first best context, and grouping the utterances of the candidate phoneme into a second output set of utterances of the candidate phoneme having the second best context.

10. An automatic speech recognition apparatus comprising:

an acoustic processor for measuring the value of at least one acoustic feature of an utterance to be recognized during each of a series of time intervals to produce a series of acoustic feature vector signals representing the acoustic feature values of the utterance;

means for selecting a hypothesis model of a hypothesis sequence of one or more phonemes, said hypothesis sequence of phonemes comprising a candidate phoneme, said candidate phoneme having a context of one or more other phonemes preceding or following the candidate phoneme in the hypothesis sequence of phonemes, said hypothesis model comprising a first candidate model of the candidate phoneme if the context of the candidate phoneme is a first best context, said hypothesis model comprising a second candidate model of the candidate phoneme if the context of the candidate phoneme is a second best context; and means for estimating, from the hypothesis model, the probability that an utterance of the hypothesis sequence of phonemes would have a series of acoustic feature values equal to the series of acoustic feature values of the utterance to be recognized;

characterized in that the apparatus further comprises:

means for storing a training script comprising a series of phonemes, said training script comprising a plurality of occurrences of the candidate phoneme, each occurrence of the candidate phoneme having a context of one or more other phonemes preceding or following the candidate phoneme in the training script;

an acoustic processor for measuring the value of an acoustic feature of an utterance of the phonemes in the training script during each of a series of time intervals to produce a series of acoustic feature vector signals representing the acoustic feature values of the utterance, each acoustic feature vector signal corresponding to an occurrence of a phoneme in the training script;

means for selecting a pair of first and second subsets of the set of occurrences of the candidate phoneme in the training script, each occurrence of the candidate phoneme in the first subset having a first context, each occurrence of the candidate phoneme in the second subset having a second context different from the first context;

means for selecting a pair of third and fourth subsets of the set of occurrences of the candidate phoneme in the training script, each occurrence of the candidate phoneme in the third subset having a third context different from the first and second contexts, each occurrence of the candidate phoneme in the fourth subset having a fourth context different from the first, second, and third contexts;

means for determining, for each pair of subsets, the similarity of the acoustic feature values of the acoustic feature vector signals corresponding to the occurrences of the candidate phoneme in one subset of the pair, and determining the similarity of the acoustic feature values of the acoustic feature vector signals corresponding to the occurrences of the candidate phoneme in the other subset of the pair, the combined similarities for both subsets in the pair being a "goodness of fit" which estimates how well the contexts of the candidate phoneme explain variations in the acoustic feature values of the utterances of the candidate phoneme;

means for identifying first and second best contexts associated with the pair of subsets having the best "goodness of fit"; and means for grouping the utterances of the candidate phoneme into a first output set of utterances of the candidate phoneme having the first best context, and grouping the utterances of the candidate phoneme into a second output set of utterances of the candidate phoneme having the second best context.

* * * * *